United States Patent
Brothers, Jr. et al.

(10) Patent No.: US 7,095,987 B2
(45) Date of Patent: Aug. 22, 2006

(54) METHOD AND APPARATUS FOR RECEIVED UPLINKED-SIGNAL BASED ADAPTIVE DOWNLINK DIVERSITY WITHIN A COMMUNICATION SYSTEM

(75) Inventors: Louis R Brothers, Jr., Dorchester, MA (US); John Cangeme, Billerica, MA (US); Alexander Flaig, Concord, MA (US); Samuel J MacMullan, Carlisle, MA (US); H. Vincent Poor, Princeton, NJ (US); Tandhoni S Rao, Ashland, MA (US); Stuart C Schwartz, Princeton, NJ (US); Triveni N Upadhyay, Concord, MA (US)

(73) Assignee: Texas Instruments Incorporated, Dallas, TX (US)

( * ) Notice: Subject to any disclaimer, the term of this patent is extended or adjusted under 35 U.S.C. 154(b) by 549 days.

(21) Appl. No.: 09/987,722

(22) Filed: Nov. 15, 2001

(65) Prior Publication Data

US 2003/0092379 A1 May 15, 2003

(51) Int. Cl.
  *H03C 7/02* (2006.01)
(52) U.S. Cl. ...................... 455/101; 455/103
(58) Field of Classification Search ............... 455/101, 455/562.1, 11.1, 12.1, 13.1, 13.2, 13.3, 13.4, 455/15–17, 25, 103
  See application file for complete search history.

(56) References Cited

U.S. PATENT DOCUMENTS

| 5,088,108 | A | 2/1992 | Uddenfeldt et al. | |
|---|---|---|---|---|
| 5,109,528 | A | 4/1992 | Uddenfeldt | |
| 5,327,577 | A | 7/1994 | Uddenfeldt | |
| 5,867,527 | A | 2/1999 | Ziv et al. | |
| 5,889,494 | A | 3/1999 | Reudink et al. | |
| 6,091,788 | A | 7/2000 | Keskitalo et al. | |
| 6,181,276 | B1 | 1/2001 | Schlekewey et al. | |
| 6,201,801 | B1 | 3/2001 | Dent | |
| 6,212,406 | B1 | 4/2001 | Keskitalo et al. | |
| 6,240,098 | B1 * | 5/2001 | Thibault et al. | 370/431 |
| 6,539,209 | B1 * | 3/2003 | Dajer et al. | 455/101 |
| 6,603,809 | B1 * | 8/2003 | Ionescu | 375/223 |
| 6,788,661 | B1 * | 9/2004 | Ylitalo et al. | 370/334 |

FOREIGN PATENT DOCUMENTS

WO   WO 00/67509   11/2000

OTHER PUBLICATIONS

A. G. Dabak et al., "A Comparison of the Open Loop Transmit Diversity Schemes for Third Generation Wireless Systems", IEEE, 2000, pp. 437-442.

(Continued)

*Primary Examiner*—Edan Orgad
*Assistant Examiner*—Angelica Perez
(74) *Attorney, Agent, or Firm*—W. James Brady, III; Frederick J. Telecky, Jr.

(57) ABSTRACT

A first downlink transmission beam and a second downlink transmission beam is determined based on a received user-derived signal. The first downlink transmission beam is substantially uncorrelated with the second downlink transmission beam. The first downlink transmission beam is associated with a portion within a first sector. The second downlink transmission beam is associated with a portion within a second sector. A first signal is diversity encoded to produce a first diversity-encoded signal. A second signal is diversity encoded to produce a second diversity-encoded signal. The first diversity-encoded signal is sent over the first downlink transmission beam. The second diversity-encoded signal is sent over the second downlink transmission beam.

53 Claims, 4 Drawing Sheets

OTHER PUBLICATIONS

A. Hottinen et al., "Transmit Diversity Using Filtered Feedback Weights in the FDD/WCDMA System", IEEE, 2000, pp. 15-21.

M. Katz et al., "Extension of Space-Time Coding to Beamforming WCDMA Base Stations", IEEE, 2000, pp. 1230-1234.

J. Ylitalo et al., "An Adaptive Antenna Method for Improving Downlink Performance of CDMA Base Stations", IEEE, 1998, pp. 599-603.

D. Shim et al., "Should the Smart Antenna be a Tracking Beam Array or Switching Beam Array?", IEEE, 1998, pp. 494-498.

K. Hugl et al., "Downlink Beamforming for Frequency Division Duplex Systems", IEEE, 1999, pp. 2097-2101.

Y. C. Liang et al., "Downlink Channel Covariance Matrix (DCCM) Estimation and Its Applications in Wireless DS-CDMA Systems", IEEE Journal on Selected Areas in Communications, vol. 19, No. 2, February 2001, pp. 222-232.

D. Rajan et al., "Transmit Diversity Schemes for CDMA-2000", IEEE, 1999, pp. 669-673.

R. A. Soni et al., "Open-Loop Transmit Diversity in IS-2000 Systems", IEEE, 1999, pp. 654-658.

E. Tiirola et al., "Performance Evaluation of Fixed-Beam Beamforming in WCDMA Downlink", IEEE, 2000, pp. 700-704.

3rd Generation Partnership Project; Technical Specification Group Radio Access Network; Physical Layer Procedures (TDD) (Release 1999), pp. 1-22.

G. D. Golden, et al., "Detection Algorithm and Initial Laboratory Results Using V-BLAST Space-Time Communication Architecture," Electr. Lett., vol. 35(1), pp. 14-16, Jan. 1999.

* cited by examiner

METHOD AND APPARATUS FOR RECEIVED UPLINKED-SIGNAL BASED ADAPTIVE DOWNLINK DIVERSITY WITHIN A COMMUNICATION SYSTEM

BACKGROUND OF THE INVENTION

The invention relates generally to wireless communications. More specifically, the invention relates to a wireless basestation and/or a user terminal that uses downlink diversity.

The demand for wireless communications services greatly outstrips the current and projected future supply, especially on the downlink (i.e., the link between the basestation and the mobile terminal, also referred to as the forward link). To meet this demand, novel technologies that improve the link level performance of wireless systems can be employed. In particular, the performance degradation due to multiple access interference (MAI) and multipath fading should be overcome. Known downlink methodologies fail to provide universal performance enhancing solutions because they either rely on multiple antennas at the mobile terminal, work effectively only in parts of the coverage area, or rely on specific characteristics of the propagation environment that are not always present in wireless communications systems.

In pursuit of a universally effective downlink solution, the most promising known approaches combine downlink diversity (DD) with spatial division multiple access (SDMA). While DD ensures robustness against signal fading, SDMA greatly reduces the effects of multiple access interference.

Known empirical evidence shows the effectiveness of DD in reducing the probability of signal outage due to deep fades. While diversity antennas at the user terminal can serve a similar purpose, these antenna are often impractical due to the required increase in terminal cost and size. See, e.g., Golden, G. D., et. al., "Detection algorithm and initial laboratory results using V-BLAST space-time communication architecture," Electr. Lett., vol. 35(1), pp. 14–16, Jan. 1999. Therefore, most known DD methods employ multiple transmissions from one or more basestation(s). The transmitted signals are diversity coded to ensure they can either be separated or added coherently at the user terminal. Diversity coding may be implemented in various ways and can be done with or without feedback from the user terminal as described, for example, in Dabak et al., "A comparison of the open loop transmit diversity schemes for third generation wireless systems", Proceedings of the 2000 IEEE Wireless Communications and Networking Conference, 2000, vol. 1, pp. 437–442.

While DD combats fading, SDMA greatly reduces MAI because each signal transmission, and thus the interference caused to other users in the system, is confined to just a portion of the cell area. One widely deployed SDMA technique is sectorization, where the entire cell is split into three or more sectors, each of which is treated as a separate cell in the sense that signals are sent within that sector without being sent into other sectors. A more effective SDMA technique is beamforming, which uses one or more beams to serve a user within a sector. The beams can be chosen from a predefined set, as is done with so-called multi-beam antennas, or can be formed adaptively according to some optimization criterion.

Recently, various methods have been proposed that combine DD and SDMA. For example, some of these known methodologies use a single array and spatially orthogonal beams for the downlink transmission. As a consequence, "the downlink performance is dictated by the angular spread of the radio environment" and "best results were (are) found for large angular spread", as concluded by Katz et al. in "Extension of space-time coding to beamforming WCDMA basestations", Proceedings of the $51^{st}$ IEEE Vehicular Technology Conference, May 2000, vol. 2, pp. 1230–1234.

At least one known system does not require spatially orthogonal beams. U.S. Pat. No. 6,201,801, entitled "Polarization diversity phased array cellular basestation and associated methods" discloses a system that uses two antenna arrays transmitting successive signal segments (e.g. TDMA frames) using alternatingly one then the other antenna array having different polarizations. Although in this system the fading of the signal received at the mobile station can be made substantially uncorrelated in successive segments at any given time, the user terminal can only receive a single multipath component. Consequently, the benefit of diversity is not obtained.

Other known systems combine SDMA and DD for terminals located in some regions by simultaneously transmitting from antennas located at spatially distinct basestations, an approach known as handover. While this approach depends neither on the spatial nor on the temporal properties of the propagation environment, it is only effective if the user terminal is located in a suitable area that is simultaneously covered by at least two basestations.

The performance gain of these various known systems is disadvantageously dependent on the location of the user terminal, and on the spatial and temporal properties of the radio environment. Thus, a need exists for combining DD and SDMA more effectively to thereby overcome this dependency, while also substantially reducing MAI.

SUMMARY OF THE INVENTION

A first downlink transmission beam and a second downlink transmission beam are determined based on a received user-derived signal. The first downlink transmission beam is substantially uncorrelated with the second downlink transmission beam. The first downlink transmission beam is associated with a portion within a first sector. The second downlink transmission beam is associated with a portion within a second sector. A first signal is diversity encoded to produce a first diversity-encoded signal. A second signal is diversity encoded to produce a second diversity-encoded signal. The first diversity-encoded signal is sent over the first downlink transmission beam. The second diversity-encoded signal is sent over the second downlink transmission beam.

DETAILED DESCRIPTION

Figure 1:
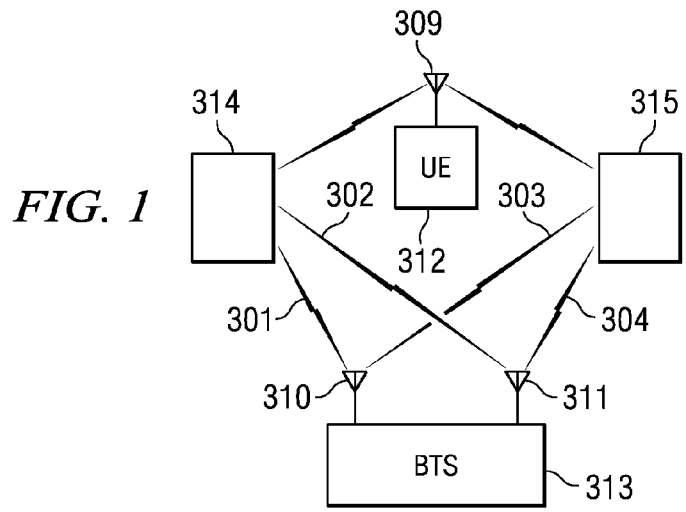
FIG. 1 depicts a multipath channel between the antenna of the user terminal and the diversity antennas of the basestation.

Embodiments of the invention relate to a communication system that allows, for example, increased capacity and/or coverage, particularly in view of channel fading and multiple access interference. Generally speaking, at least two beams each send diversity-encoded signals from, for example, at least two corresponding antenna arrays. The beams can be determined to provide the user terminal with diversity irrespective of the spatial and temporal properties of the propagation paths between the basestation and each user, while reducing any deleterious effects associated with multiple access interference.

In one embodiment, a first downlink transmission beam and a second downlink transmission beam is determined based on a received user-derived signal. The first downlink transmission beam is substantially uncorrelated with the second downlink transmission beam. The first downlink transmission beam is associated with a portion within a first sector. The second downlink transmission beam is associated with a portion within a second sector. A first signal is diversity encoded to produce a first diversity-encoded signal. A second signal is diversity encoded to produce a second diversity-encoded signal. The first diversity-encoded signal is sent over the first downlink transmission beam. The second diversity-encoded signal is sent over the second downlink transmission beam.

A sector is a portion of the mobile cell typically specified by the antenna configuration of the mobile system antennas. In other words, a sector is a portion of the directional antenna coverage from an otherwise omnidirectional antenna providing a 360° coverage. A sector can be, for example, a 120° portion so that an associated cell can have three such portions. Because SDMA can be used in the systems described herein, the transmission beam can be sent over a portion of a given sector rather than being sent over the entire sector. Such a configuration can reduce the MAI because each signal transmission is sent over a small portion of the entire cell. Thus, in a system that uses two downlink transmission beams, each beam can be sent over a portion of a given sector.

Note that the term "transmission beam" is used herein to define a signal transmission in a particular direction. These signal transmissions are not necessary confined to very narrow angular ranges, but rather are over a relatively wide range. Thus, the beam paths shown in the figures discussed below are representations of signals being transmitted over multipaths, which would be presumably over a much greater area than the lines shown in the figures.

The term "user-derived signal" is used herein to define a signal received at the basestation that is based on the user terminal (also referred to as a mobile terminal). The user-derived signal can be, for example, an uplink signal received at the basestation directly from the mobile terminal. Alternatively, the user-derived signal can be, for example, a feedback signal where the mobile terminal receives a downlink signal and forwards a signal to a different location where the feedback signal is then provided to the basestation. In either case, the user-derived signal indicates, for example, information about the location of the mobile terminal and the nature of the propagation conditions between the mobile terminal and basestation.

The term "diversity-encoded signal" is used herein to define a signal that is encoded and separable at a receiver from another encoded signal. For example, diversity-encoded signals can be two signals with orthogonal polarizations or coding that are coherently combined at a receiver. Such examples of diversity-encoded signals can allow the receiver to have a reduced decoder error rate than would be the case for a non-diversity-encoded signal.

In sum, systems described herein can transmit at least two transmission beams directed to separate paths (or separate directions) that are determined to be optimal based on the received uplink multipath signals (either directly from the user terminal or through an intermediate device). In other words, the systems perform downlink diversity (DD). In combination with DD, the systems described herein can transmit and receive signals (or beams) over a portion of one or more sectors (or over a reduced portion of the overall cell). This, consequently, greatly reduces MAI because each signal transmission and thus the interference caused to other users in the system is confined to just a portion of the overall cell. In other words, the systems also perform space-division multiple access (SDMA). Thus, the systems described herein can combine DD with SDMA to improve performance.

FIG. 1 depicts a multipath channel between the antenna of the user terminal and the diversity antennas of the basestation. As shown in FIG. 1, a basestation 313 is coupled to diversity antennas 310 and 311. The user terminal (also referred to as user equipment (UE)) 312 includes an antenna 309. Basestation 313 communicates with UE 312 via, for example, signal paths 301–304 that result from the interaction of radio waves with, for example, physical objects 314 and 315 such as buildings, trees, or hills.

Embodiments of the invention relate to various characteristics of the cellular radio channel. These various characteristics are discussed below with reference to FIG. 1.

A first characteristic of the cellular radio channel is the angular and temporal diversity that results from signal propagation along various paths 301–304 between the antenna 309 of the UE 312 and the diversity antennas 310 and 311 of the basestation 313. The multiplicity of paths is a result of the interaction of radio waves with physical objects 314 and 315. Signals traveling on distinct paths arrive at the receive antenna, in general, at different times and with distinct direction of arrivals (DOAs), providing both the basestation and the user terminal with multipath diversity.

A second characteristic of the cellular radio channel is the attenuation experienced along a path. Multipath signals experience various forms of attenuation, namely path loss, shadowing, and rapid signal strength variations referred to as fast fading. Depending on the propagation environment, one or more of these attenuation factors are uncorrelated from path to path. While path loss is roughly proportional to some power of the path length, for example four, shadowing can be correlated to various degrees depending on how geometrically similar different multipaths are. Fast fading, however, is typically uncorrelated from path to path.

A third characteristic of the cellular radio channel is the fact that the geometry of the multipath propagation is reciprocal in the long term. In other words, signals traveling from the user terminal to the basestation follow approximately the same paths as signals traveling from the basestation to the user terminal. This is the case even if two distinct carrier frequencies are employed on the uplink and downlink as is the case, for example, in the Frequency Division Duplex (FDD) mode of wideband code division multiple access (WCDMA), where the uplink and downlink carriers are separated by 190 MHz. The fact that uplink and downlink signals travel along the same path implies that the slowly varying signal attenuation factors, namely path loss and shadowing, are closely related on uplink and downlink. The fast fading on up and downlink, however, is substantially uncorrelated if the downlink is outside of the coherence bandwidth of the uplink, as is the case for, for example, WCDMA.

Due to the motion of the user terminal and system power control, the DOAs, the times-of-arrival (TOAs), and the received powers of the multipath signals change as a function of time. These changes, however, are slow and can be tracked by the receiver using techniques similar to those described in U.S. Pat. Nos. 6,212,406 and 5,867,527; the disclosures of which are both incorporated herein by reference.

Figure 2:
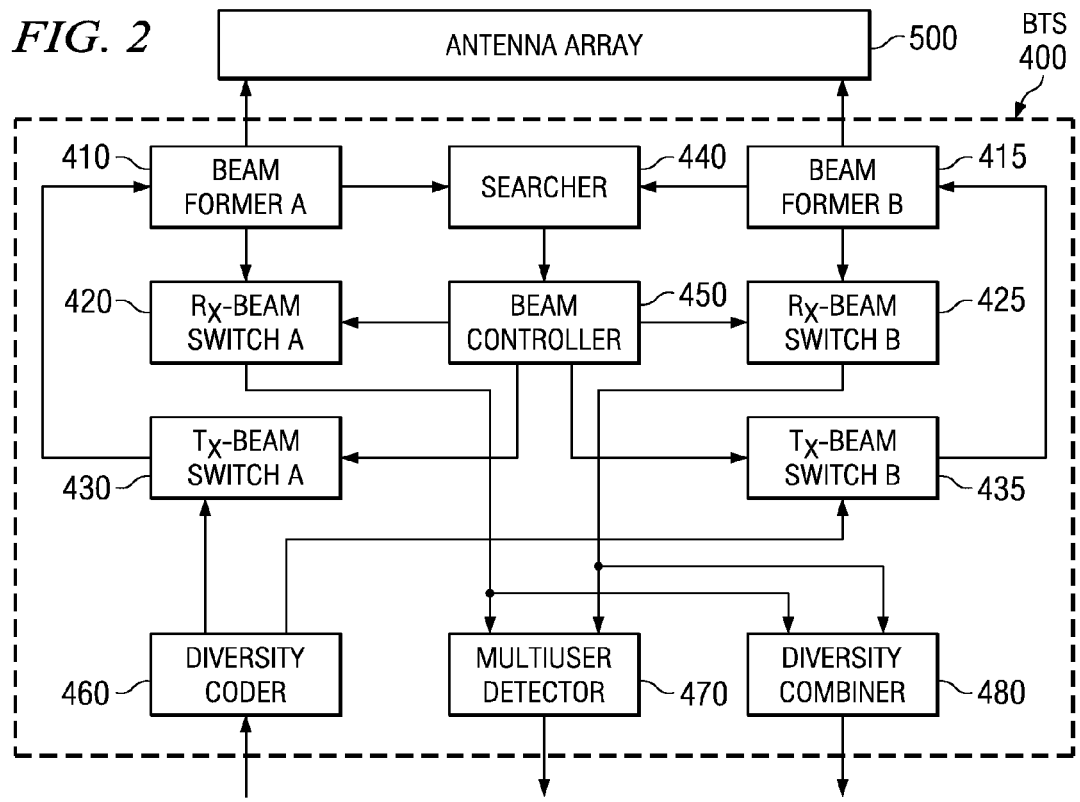
FIG. 2 shows a system block diagram of a basestation system according to an embodiment of the invention.

FIG. 2 shows a system block diagram of a basestation system according to an embodiment of the invention. As shown in FIG. 2, basestation 400 is coupled to an antenna array 500. The antenna array can be, for example, two antenna arrays that provide transmit diversity while also exploiting the angular diversity of the multipath channel. The antenna arrays can have, for example, orthogonal polarizations. Orthogonally polarized antenna arrays advantageously can be more compact than space diversity arrays. In alternative embodiments, space diversity arrays may be used without compromising the effectiveness of the system.

The basestation system 400 includes beam former A 410, beam former B 415, receive beam switch A 420, receive beam switch B 425, transmit beam switch A 430 and transmit beam switch B 435, searcher 440, beam controller 450, diversity coder 460, multi-user detector 470 and diversity combiner 480. Beam former A 410 is coupled to antenna array 500, searcher 440, receive beam switch A 420, and transmit beam switch A 430. Similarly, beam former B 415 is coupled to antenna array 500, searcher 440, receive beam switch B 425, and transmit beam switch B 435. Searcher 440 is coupled to beam controller 450. Beam controller 450 is also coupled to receive beam switch A 420, receive beam switch B 425, transmit beam switch A 430, and transmit beam switch B 435. Receive beam switch A 420 and receive beam switch B 425 are both coupled to multi-user detector 470 and diversity combiner 480. Diversity coder 460 is coupled to transmit beam switch A 430 and transmit beam switch B 435.

In embodiments where the antenna array includes two antenna arrays, each antenna array is associated with its own beam former. In other words, one antenna array is associated with beam former 410 and the other antenna array is associated with beam former 415. Beam formers 410 and 415 are capable of generating a finite number of beams by directing the gain of the antenna array 500 toward some selected direction. The beams can be formed at the system front end, for example, at the beam formers 410 and 415 with analog components, such as a Butler matrix, or can be formed in baseband using digital signal processing techniques.

Figure 3:
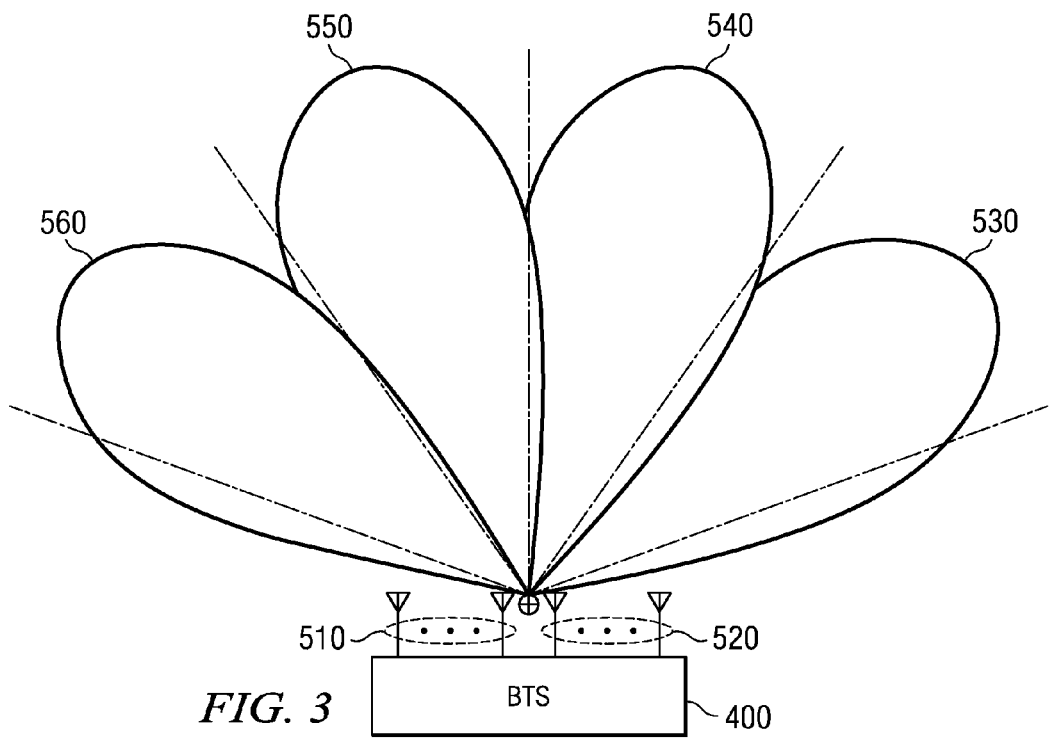
FIG. 3 shows an example of an antenna gain profile for a basestation system according to an embodiment of the invention.

FIG. 3 shows an example of an antenna gain profile for a basestation system according to an embodiment of the invention. As shown in FIG. 3, the basestation 400 can generate multiple beams (e.g., as defined by main lobes of the antenna gain profile). More specifically, the antenna array 500 includes antenna array 510 and 520 each of which generates one of four different beams 530–560 at a given time. First antenna array 510 and second antenna array 520 can generate beam patterns that spatially coincide, for example, where both antenna arrays 510 and 520 generate beams at gain direction 560. In such a case where the antenna array generate beams that spatially coincide, the antenna arrays have orthogonal polarizations. Alternatively, first antenna array 510 and second antenna array 520 can generate beam patterns that do not spatially coincide, for example, where antenna array 510 generates a beam at gain direction 530 and second antenna array 520 generates a beam at gain direction 540.

Searcher 440 can scan, for example continuously, through all uplink beams to search for multipath components of the desired signal. The searching can be done in the time domain, in the spatial domain, or two-dimensionally in the space-time domain as described, for example, in U.S. Pat. No. 6,212,406. Searching for the multipath components of the desired signal allows the basestation system 400 to perform directed diversity reception of a user's signal. In other words, the searcher can determine the components of a user's signal, which arrive from one or more paths and from a multiplicity of angles at the receiver.

Returning to FIG. 2, searcher 440 can include, for example, a set of correlators that are allocated to all possible offsets in a window around the expected (times-of-arrival) TOAs and/or DOAs of the multipath signals. The output of the correlators are compared to a threshold to find components that are located above the noise floor and to generate a log of the average signal power of each path in every beam. Averaging the signal power of each path in every beam allows the fast fading components, which are uncorrelated between the uplink and downlink, to be filtered out.

Table 1 shows an example of a multipath-beam profile for four beams and four paths. Based on the multipath log, a beam controller identifies a first beam that contains the strongest multipath component and a second beam that contains the second strongest multipath component. The first and second beams can overlap. In addition, the searcher may identify additional beams that contain relevant multipath components.

TABLE 1

|        | Beam 1      | Beam 2      | Beam 3      | Beam 4      |
|--------|-------------|-------------|-------------|-------------|
| Path 1 | $P_{1,1}$   | $P_{1,2}$   | $P_{1,3}$   | $P_{1,4}$   |
| Path 2 | $P_{2,1}$   | $P_{2,2}$   | $P_{2,3}$   | $P_{2,4}$   |
| Path 3 | $P_{3,1}$   | $P_{3,2}$   | $P_{3,3}$   | $P_{3,4}$   |
| Path 4 | $P_{4,1}$   | $P_{4,2}$   | $P_{4,3}$   | $P_{4,4}$   |

Beam signals that contain relevant multipath signals can be either provided to diversity combiner 480 and/or to multiuser detector 470. For example, the relevant multipath signals can be provided to a multiuser detector such as the one disclosed in U.S. patent application Ser. No. 09/820,963, entitled "Method and Apparatus for Regenerative Signal Based Parallel Interference Cancellation Within a Communication System" for demodulation.

Directed diversity transmission allows the exploitation of the long-term reciprocity of the multipath channel. For example, the beams that contain the strongest multipath components on the uplink can be used for downlink transmission. More specifically, the beam that contained the strongest multipath component on the uplink can be used on the downlink to carry a first diversity signal. The beam that contained the second strongest signal on the uplink can be used on the downlink to carry a second diversity signal. The first and second diversity signals can be generated by diversity coder 460 (described in more detail later). In one embodiment, the first and second diversity signals can be transmitted with the same power. In other embodiments, however, other power distributions are possible. For instance, it may be beneficial to match the transmit powers to the receive powers. In general, by transmitting two diversity signals using two orthogonally polarized beams, the user terminal is provided with at least two substantially uncorrelated signals.

In one embodiment, the number and shape of the beams on the uplink and downlink are the same. Thus, the channel information from the uplink can be used directly to control the downlink transmission. The number and shape of the beams, however, need not be identical. Instead, the multipath profile measured on the uplink can be mapped to the downlink. For example, the mean spatial covariance matrix of the downlink, which contains all information relevant to beam forming/selection, can be estimated based on the mean spatial covariance matrix of the uplink. See, e.g., Hugl et al. in "Downlink beamforming for frequency division duplex systems," the disclosure of which is incorporated herein by reference. Alternatively, Liang and Chin discuss several algorithms that exploit the spatial covariance matrix for downlink beamforming in "Downlink Channel Covariance Matrix (DCCM) Estimation and Its Application in Wireless DS-CDMA Systems", IEEE Journal on Selected Areas in Communications, vol. 19, No. 2, 2001; the disclosure of which is incorporated herein by reference.

Figure 4:
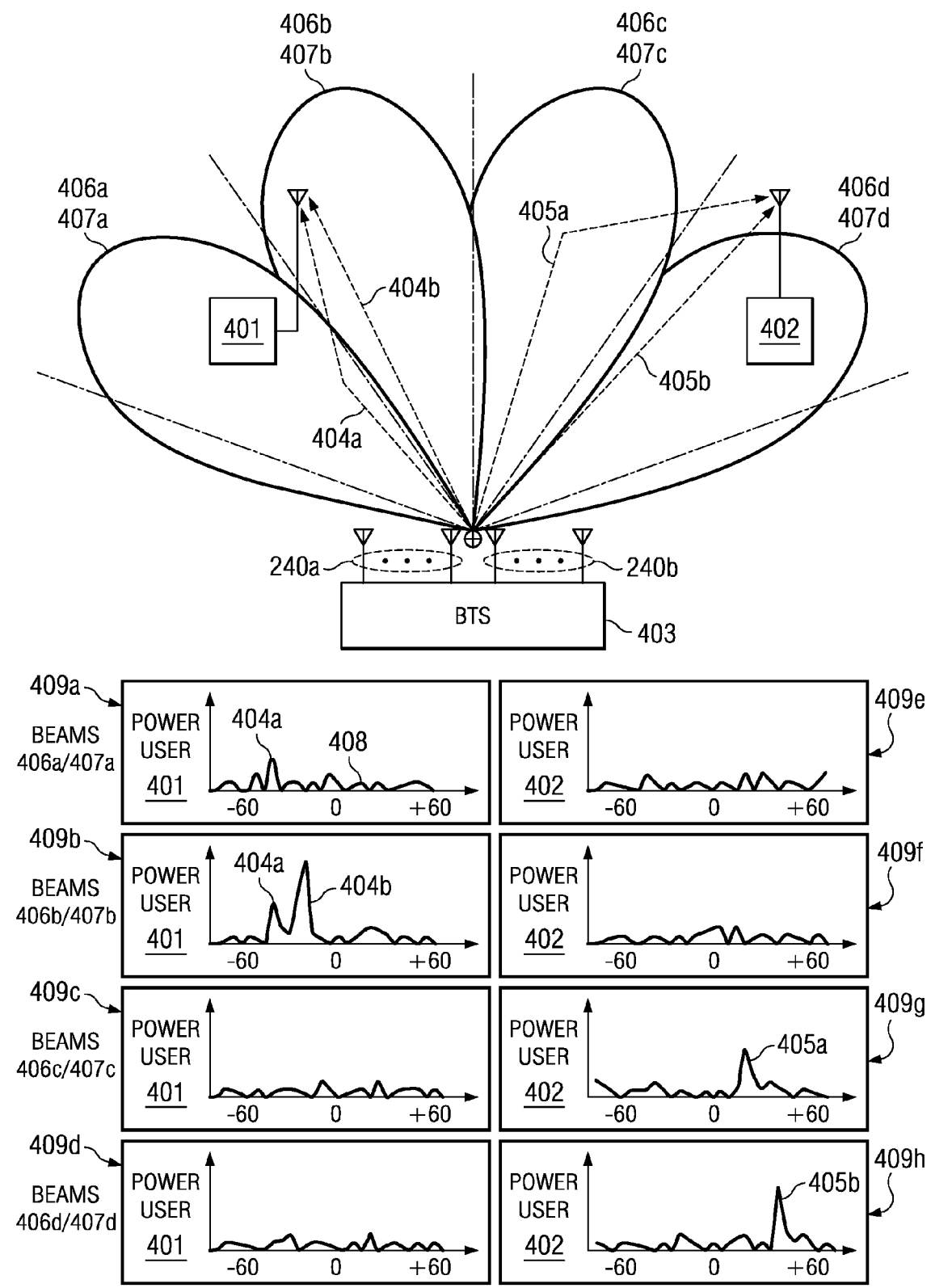
FIG. 4 illustrates an example of a four-beam antenna pattern generated by a basestation and the corresponding power profiles, according to an embodiment of the invention.

FIG. 4 illustrates an example of a four-beam antenna pattern generated by a basestation and the corresponding power profiles, according to an embodiment of the invention. Basestation 403 is equipped with two orthogonally polarized diversity antenna arrays 240a and 240b. Each of the diversity arrays is capable of generating and receiving four bidirectional beams pointing, respectively, −45°, −15°, +15° and +45° off boresight. In particular, first antenna array 240a generates beams 406a–406d with first polarization, while second antenna array 240b generates beams 407a–407d with second polarization. Beams 406a–406d can be, for example, slant −45° polarized, and beams 407a–407d can be, for example, polarized with +45°. Furthermore, in this embodiment, beams 406a–406d and beams 407a–407d coincide spatially.

In this example, a first user 401 communicates via paths 404a and 404b with basestation 403. Paths 404a and 404b arrive from approximately −20° and −35° off boresight. The multipath powers received via paths 404a and 404b exceed the noise floor 408 in the beam power profiles of beam 406a and 406b but do not register in the beam power profiles of beam 406c and 406d as depicted in power profiles 409a–h. Simultaneous to the communication between basestation 403 and user 401, basestation 403 communicates with user 402 via paths 405a and 405b. Paths 405a and 405b arrive from approximately +15° and +35° off boresight, respectively. Path 405a rises out of the noise floor 408 in the power profile of beams 406c and 407c. Path 405b exceeds the noise floor 408 in the power profile of beams 406d and 407d.

Basestation 403 selects the beams for the downlink transmission based on the beam power profiles 409a–409h. Note that in this embodiment, basestation 403 selects beams for downlink transmission from a set of possible predetermined beam locations. In other embodiments, the basestation can determine the beams for downlink transmission by techniques other than selecting from a predetermined set of beams. For example, in other embodiments, the basestation can determine a beam from a continuous range of possible beam locations.

Note also that in this embodiment, basestation 403 selects two beams for downlink transmission. These two beams are selected because they are no less optimal from any of the other possible beams that were not selected. Typically, such two selected beams are the two most desirable beams based on the appropriate criteria (e.g., the beams having the highest signal amplitude indicative of the strongest multipaths). In other words, the term "no less optimal" is used herein in the context of the determination of at least two beams from multiple possible beams.

Returning to basestation 403, in communicating to user 401, basestation 403 transmits first diversity signal via beam 406b and second diversity signal via beam 407b. Beams 406b and 407b are selected by comparing the power profiles 409a–409d that are associated with user 401. The highest multipath powers are within power profile 409b; these multipath power peaks are labeled 404a and 404b. Because the highest multipath powers are within power profile 409b, the beams for downlink transmission are selected for beams 406b and 407b, which correspond to the direction associated with the power profile 409b.

Note that beams 406b and 407b coincide spatially, but have orthogonal polarizations. Due to the orthogonal beam polarizations, the first and second diversity signals experience, in general, nearly uncorrelated fading and can be combined at the receiver of user 401 to substantially improve the signal quality. Furthermore, because beams 406b and 407b overlap, the interference to other users in the system is significantly reduced over known systems. In other words, because beams 406b and 407b are transmitted within only a portion of the overall sector within which beams 406a–406d and 407a–407d operate, potential interference to other users within the sector is significantly reduced over known systems.

To communicate with user 402, basestation 403 transmits the first and second diversity signals via beams 406d and 407c, respectively. In this case, the first and second diversity signals for user 402 are transmitted via two beams that are pointed in distinct directions to account for the larger angular spread of paths 405a and 405b. Beams 406d and 407c are selected by comparing the power profiles 409e–409h that are associated with user 402. The highest multipath powers are within power profiles 409g and 409h; these multipath power peaks are labeled 405a (within power profile 409g) and 405b (within power profile 409h). Because the highest multipath powers are within power profiles 409g and 409h, the beams for downlink transmission are selected for beams 407c and 407d, which correspond to the direction associated with the power profiles 409g and 409h, respectively.

The first and second diversity signals for user 402 could be transmitted using beams with the same polarization. Choosing distinct polarizations, however, even in this case allows the transmit load to be balanced between first diversity array 240a and second diversity array 240b.

Note that diversity signals can be generated in a number of ways. For example, according to a first method, the diversity coder 460 can generate diversity signals that are separable at the user terminal. Such separability can be achieved in various ways. For example, signal separability can be obtained by delaying the signals such that the delayed signals do not correlate, by space-time coding the signals, or by multiplying the signals by orthogonal codes. In one embodiment, first and second diversity signals are space-time coded to obtain the highest level of diversity.

Alternatively, according to a second method, the diversity coder 460 can generate diversity signals that add constructively at the user terminal. This can be based on knowledge of the propagation conditions. The propagation conditions can be estimated at the user terminal and periodically fed back to the basestation. In other words, feedback information (e.g., phase or amplitude related information) can be associated with a user-derived signal (e.g., provided directly from the user terminal or indirectly from a different location). Provided that this feedback is sufficiently fast and accurate, this second method can potentially provide greater performance improvements than the above-mentioned first method. In one embodiment according to the second method, the diversity signals differ only in their phase and/or amplitude and are possibly delayed with respect to each other.

Both methods can provide the user terminal with valuable signal diversity in addition to the system-inherent multipath diversity. In one embodiment, both diversity signals are transmitted with half of the total signal power allocated for the transmission of each of the user's signal. Alternatively, the powers allocated to the diversity signals can be weighted according to the average power received on these paths.

All of the third generation WCDMA standards support implementations of the diversity coder according to the first and second method. The following illustrates two possible implementations of the diversity coder 460 consistent with the 3$^{rd}$ Generation Partnership Project (3GPP) WCDMA standard. In WCDMA, the user's uplink information signal consists of a Dedicated Physical Data Channel (DPDCH) and a Dedicated Physical Control Channel (DPCCH). On the downlink, the DPDCH and DPCCH are multiplexed onto a single channel, namely the Dedicated Physical Channel (DPCH). The DPCH corresponds to the user's information signal.

Figure 5:
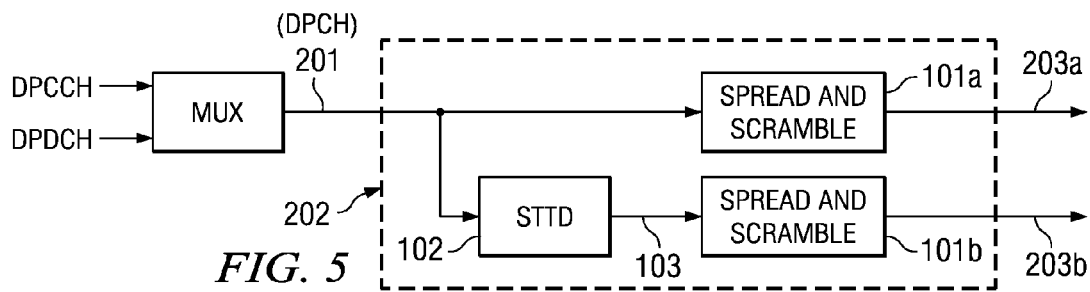
FIG. 5 shows an example of a system block diagram of a diversity coder that uses space-time coding according to an embodiment of the invention.

FIG. 5 shows an example of a system block diagram of a diversity coder that uses space-time coding according to an embodiment of the invention. The diversity coder 202 shown in FIG. 5 can be used for the diversity coder 460 shown in FIG. 2.

As shown in FIG. 5, the user's information signal 201 is sent to to space-time coder (STTD) 102. Space-time coder 102 interleaves and rotates the quadrature phase shift keyed (QPSK) symbols of the signal 201. The encoding is done such that the encoded signal 103 is orthogonal to the original user's signal 201. The signals 201 and 103 are referred to as space-time coded. Space-time coded signals 103 and 201 are sent simultaneously to spreading and scrambling modules 101a and 101b, respectively. Spread and scrambling modules 101 multiply the DPCH (i.e., signal 201) and space-time coded DPCH (i.e., signal 103) with a spreading code unique to the user and with a scrambling code unique to the sector (or unique to the cell for a cellular system that is not sectorized). The spread and scrambled signals that are the output of spreading and scrambling modules 101 correspond to the first and second transmit diversity signals 203a and 203b.

When diversity coder 460 (shown in FIG. 2) is implemented by diversity coder 202 (shown in FIG. 5), the receiving user terminal can distinguish the first and second transmit diversity beam without the need for any additional information. In addition, an embodiment using the diversity coder 202 (shown in FIG. 5) allows the diversity signals to be formed without feedback from the user terminal.

Figure 6:
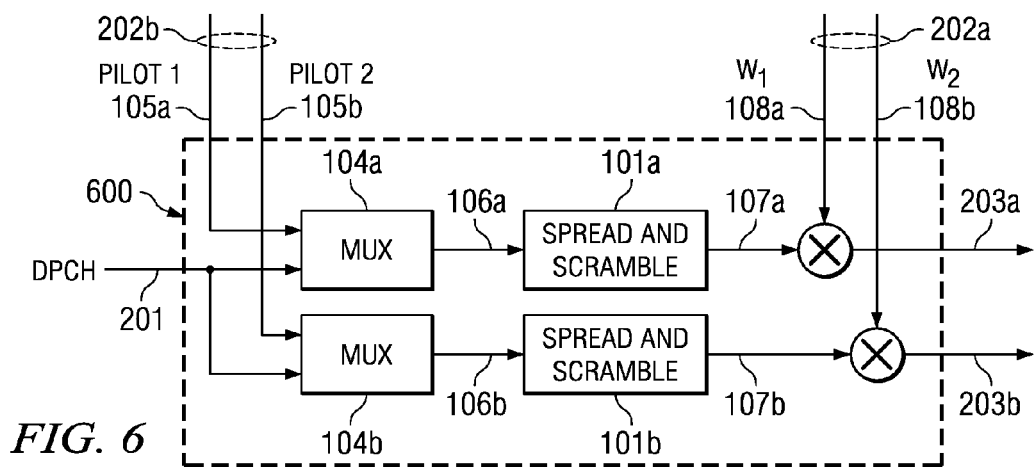
FIG. 6 shows an example of a system block diagram of a diversity coder that utilizes feedback from the user terminal to generate transmit diversity signals, according to an embodiment of the invention.

FIG. 6 shows an example of a system block diagram of a diversity coder that uses feedback from the user terminal to generate transmit diversity signals 203, according to an embodiment of the invention. The diversity coder 600 shown in FIG. 6 can be used for the diversity coder 460 shown in FIG. 2.

As shown in FIG. 6, the user's information signal 201 is sent to multiplexers 104a and 104b. Multiplexer 104a inserts a first pilot sequence 105a into the user's information signal 201. Multiplexer 104a inserts a second pilot sequence 105b into the user's information signal. First pilot sequence 105a and second pilot sequence 105b are orthogonal. The multiplexed signals 106a and 106b are sent to spreading and scrambling modules 101a and 101b, respectively. Spreading and scrambling modules 101a and 101b produce first and second spread and scrambled sequences 107a and 107b, respectively. First scrambling sequence 107a is multiplied with a first complex-valued weight 108a to produce first transmit diversity signal 203a; second scrambling sequence 107b is multiplied with second complex-valued weight 108b to produce second transmit diversity signal 203b. Complex-valued weights 108a and 108b adjust the phase and amplitude of the user's signal according to feedback information generated, for example, at the user terminal based on first and second pilot sequences 105a and 105b.

When diversity coder 460 (shown in FIG. 2) is implemented by diversity coder 600 (shown in FIG. 6), the receiving user terminal can coherently combine the first and second transmit diversity beams.

Figure 7:
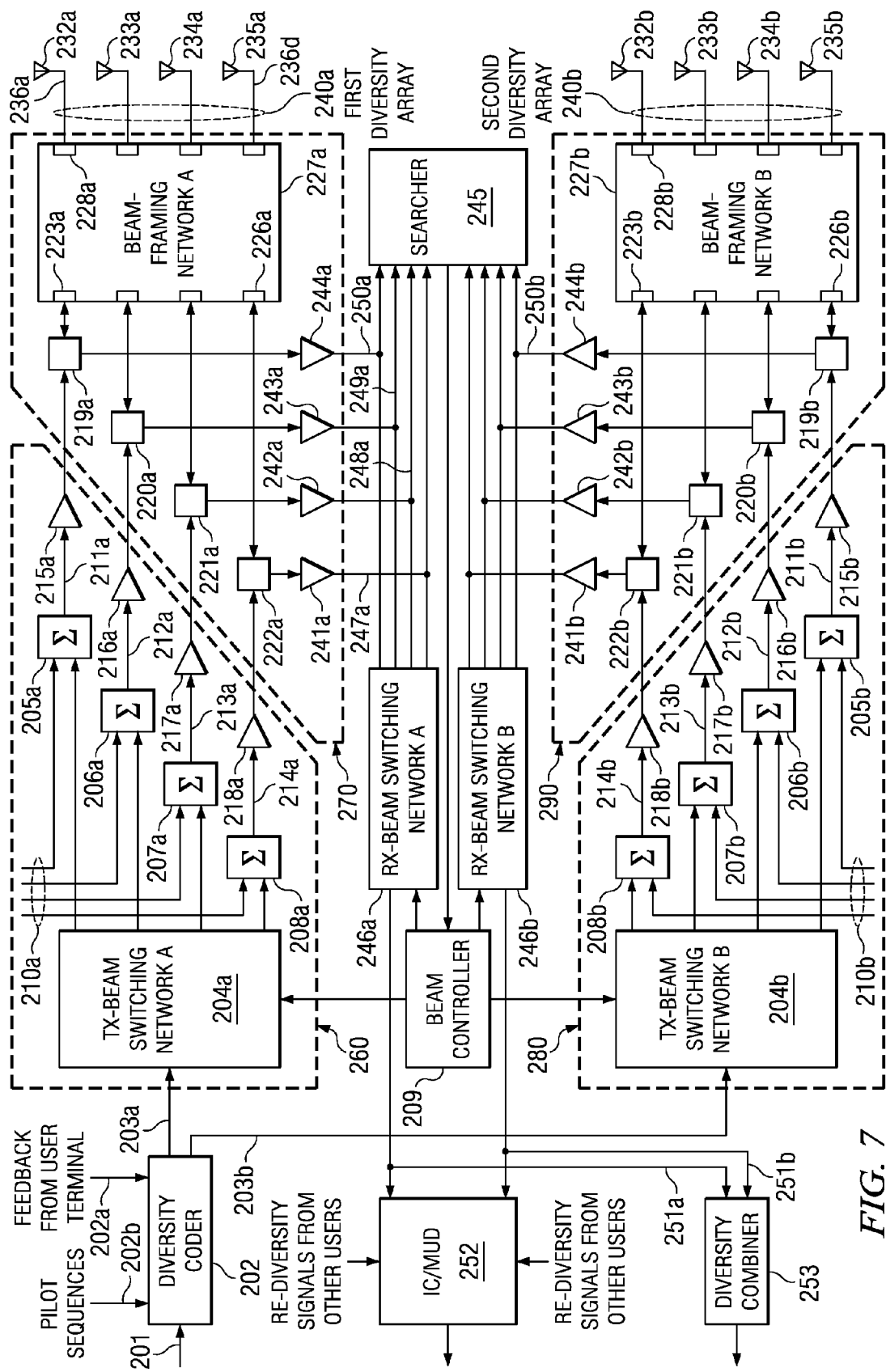
FIG. 7 depicts a system block diagram of equipment for a basestation according to an embodiment of the invention.

FIG. 7 depicts a system block diagram of equipment for a basestation according to an embodiment of the invention. The basestation equipment 200 includes diversity antenna arrays 240a and 240b, beam former A 270, beam former B 290, transmit beam switch A 260, transmit beam switch B 280, beam controller 209, diversity coder 202, searcher 245, receive beam switching networks 246a and 246b, diversity combiner 253 and multiuser detector 252. Diversity antennas 240a and 240b are coupled to beam former A 270 and beam former B 290, respectively. Beam former A 270 and beam former B 290 are coupled to searcher 245 and respectively coupled to transmit beam switch A 260 and transmit beam switch B 280. Transmit beam switch A 260 and transmit beam switch B 280 are coupled to beam controller 209. Beam controller 209 is also coupled to receive switching networks 246a and 246b and searcher 245. Receive switching networks 246a and 246b are also coupled to multiuser detector 252 and diversity combiner 253.

Beam former A 270 includes beam-forming network A 227a, diplexers 219a–222a, and low noise amplifiers (LNAs) 241a–244a. Beam-forming network A 227a is coupled to antenna elements 232a–235a and to diplexers 219a–222a. Diplexers 219a–222a are coupled to LNAs 241a–244a, respectively, which are coupled to searcher 245 and receive-beam switching network A 246a.

Transmit beam switch A 260 includes transmit-beam switching network A 204a, summation units 205a–208a and power amplifiers 215a–218a. Transmit-beam switching network A 204a receives signals from diversity coder 202 and beam controller 209, and is coupled to summation units 205a–208a. Summation units 205a–208a also receives transmit diversity signals 210a. Summation units 205a–208a are coupled to power amplifiers 215a–219a, respectively, which are in turn coupled to diplexers 219a–222a of beam former A 270.

Beam former B 290 includes beam-forming network B 227b, diplexers 219b–222b, and LNAs 241b–244b. Beam-forming network B 227b is coupled to antenna elements 232b–235b and to diplexers 219b–222b. Diplexers 219b–222b are coupled to LNAs 241b–244b, respectively, which are coupled to searcher 245 and receive-beam switching network B 246b.

Transmit beam switch B 280 includes transmit-beam switching network B 204b, summation units 205b–208b and power amplifiers 215b–218b. Transmit-beam switching network B 204b receives signals from diversity coder 202 and beam controller 209, and is coupled to summation units 205b–208b. Summation units 205b–208b also receive transmit diversity signals 210b. Summation units 205b–208b are coupled to power amplifiers 215b–219b, respectively, which are in turn coupled to diplexers 219b–222b of beam former B 290.

In the following, the operation of the basestation equipment is described in more detail. In general, diversity antenna arrays 240a and 240b receive multipath signals from a multiplicity of users. Antenna elements 232a–235a and 232b–235b supply beam forming networks 227a and 227b, respectively, with received signals via cables 236a–239a and 236b–239b, respectively. In particular, antenna elements 232a and 232b supply ports 228a and 228b, respectively; antenna elements 233a and 233b supply ports 229a and 229b, respectively; antenna elements 234a and 234b supply ports 230a and 230b, respectively; and antenna elements 234a and 234b supply ports 231a and 231b, respectively.

Beam forming networks 227a and 227b receive signals at ports 228a–231a and ports 228b–231b, respectively, and then split these signals to produce split received signals. Beam forming networks 227a and 227b establish a deterministic phase relationship between these split received signals to produce phased received signals. The phased received signals are output from beam forming networks 227a and 227b from ports 223a–226a and 223b–226b, respectively. Each of the ports 223a–226a and 223b–226b corresponds to one directional received beam. Thus, the signals at ports 223a–226a and 223b–226b contain all signals received by the corresponding directional beams. Ports 223a–226a and 223b–226b provide the receive beam signals to diplexers 219a–222a and 219b–222b, respectively.

Diplexers 219a–222a and 219b–22b route the received beam signals to LNAs 241a–244a and 241b–244b, respectively. LNAs 241a–244a and 241b–244b amplify and forward the receive beam signals to beam-path searcher 245 and to receive beam switching networks 246a and 246b. Beam switching network 246a selects one of the amplified receive beam signals 247a–250a as instructed by beam controller 209. Similarly, beam switching network 246b selects one of the amplified receive beam signals 247b–250b as instructed by beam controller 209. The selected receive diversity signals 251 may correspond to receive antenna beams pointed in the same direction or may correspond to antenna beams pointed in different directions. The diversity beam signals 251 contain the strongest multipath components of the user signal of interest. In an alternative embodiment, the diversity beam signals can contain other multipath components of the user signal of interest.

Diversity combiner 253 receives receive diversity signals 251a and 251b from beam switching networks 246a and 246b, respectively. In addition, diversity combiner 253 can receive, for example, information about the power, timing, and possibly about the phase of the receive diversity signals 251a and 251b. Diversity combiner 253 combines receive diversity signals 251a and 251b according to some optimality criterion. For example, the receive diversity signals 251a and 251b can be time-aligned and weighted proportionally to their respective powers. This form of combining is generally known as "maximal ratio combining." The receive diversity signals can be combined coherently or non-coherently depending on the modulation scheme in use.

Receive diversity signals 251a and 251b are provided to multi-user detector 252. Multi-user detector 252 receives receive diversity signals from all active users in the system. In addition, multi-user detector 252 can receive, for example, information about the power, the timing, and, possibly, the phase of all multipath signals of all users. Multi-user detector 252 generates demodulated high quality data for each user. Multi-user detector 252 can be implemented in one of many ways. For example, multi-user detector 252 can be implemented according to the disclosure of U.S. patent application Ser. No. 09/820,963, entitled "Method and Apparatus for Regenerative Signal Based Parallel Interference Cancellation Within a Communication System."

Beam searcher 245 can scan (e.g., continuously scan) the beam signals at ports 223a–226a and ports 223b–226b for the presence of multipath signals of the user of interest as described. Searcher 245 provides beam controller 209 with the multipath profile of each beam. Beam controller 209 identifies the number of the beam that contains the highest signal power level by sorting the received powers in the multipath-beam power profile. This number is denoted by $beam_{max}$. Furthermore, beam controller 209 also identifies the beam that contains the second strongest power level. This number of the latter beam is denoted by $beam_{max-1}$. Beam controller 209 sends $beam_{max}$ and $beam_{max-1}$ to receive beam switching network 246a and receive beam switching network 246b, respectively.

Beam switching networks 246a and 246b receive amplified receive diversity signals 247a–250b and 247b–250b, respectively. Beam switching network 246a routes amplified receive diversity signal $beam_{max}$ 251a to diversity combiner 253, while beam switching network 246b routes amplified receive diversity signal $beam_{max-1}$ 251b to diversity combiner 253. Thus, diversity combiner 253 is provided with the beam signals that contain the strongest multipaths from first diversity array 240a and second diversity array 240b.

Diversity coder 202 receives information signal 201. Information signal 201 carries, for example, interleaved and encoded user data. Diversity coder 202 replicates information signal 201 and encodes the replicated signal to produce first and second transmit diversity signals 203a and 203b. Diversity signals 203a and 203b are sent to beam switching networks 204a and 204b, respectively. Beam switching network 204a routes transmit diversity signal 203a to one of the summation units 205a, 206a, 207a, or 208a; beam switching network 204b routes transmit diversity signals 203b to one of the summation units 205b, 206b, 207b or 208b. Each one of summation units 205a–208a and 205b–208b corresponds to one directional beam, as directed by beam controller 209. In particular, first transmit diversity signal 203a is routed to the summation unit corresponding to $beam_{max}$ and second transmit diversity signal 203b is routed to the summation unit corresponding to $beam_{max-1}$. First and second transmit diversity signals 203a and 203b may be routed to beams pointed in the same directions or in different directions. In addition to diversity signals 203a and 203b, summation units 205a–208a and 205b–208b can receive a multiplicity of first transmit diversity signals 210a and second transmit diversity signals 210b from a multiplicity of users.

Summation units 205a–208a and 205b–208b sum first and second transmit diversity signals to form first transmit beam signals 211a–214a and second transmit beam signals 211b–214b, respectively. First transmit beam signals 211a–214a and second transmit beam signals 211b–241b are sent to power amplifiers 215a–218a and 215b–218b, respectively. Power amplifiers 215a–218a and 215b–218b amplify transmit beam signals 211a–214a and 211b–215b, respectively, and forward them to diplexers 219a–222a and 219b–222b, respectively. Diplexers 219a–222a and 219b–222b direct the amplified transmit beam signals to ports 223a–226a and 223b–226b, respectively, of beam forming networks 227a and 227b, respectively. Beam forming networks 227a and 227b split the amplified transmit beam signals applied to ports 223a–226a and 223b–226b, respectively, establish a deterministic phase relationship between the split signals, and direct the phased signals to ports 228a–231a and 228b–231b, respectively. Ports 228a–231a and 228b–231b are connected to antenna elements 232a–235a and 232b–235b, respectively, via cables 236a–239a and 236b–239b, respectively.

Embodiments of the invention can have several advantages. First, for example, the downlink transmission beams can be defined as those having the strongest paths. This spatially selective transmission leads to a significant reduction of multiple access interference level on the downlink. This is particularly the case for macro cells where the probability of the strongest paths being located in the same beam is high due to the small angular spread.

Second, diversity can be provided by the multitude of beams used on the downlink. This form of diversity can combat the effects of fast fading, which cannot be predicted based on uplink measurements. In this way, if one of the downlink paths goes into a deep fade, for example, the others may still be usable by the user terminal.

Third, interference can be reduced so that it is primarily limited to that contained in those uplink beams associated with the strongest paths. This interference reduction can be utilized in many ways. It can be used, for example, to increase the received signal-to-interference-plus-noise ratio (SINR) to a level that is more beneficial for other interference management techniques such as the method disclosed in U.S. patent application Ser. No. 09/820,963, entitled "Method and Apparatus for Regenerative Signal Based Parallel Interference Cancellation Within a Communication System." Alternatively, this interference reduction can be used to lower the transmit power required at the user terminal to meet the target SINR at the basestation. Either of these approaches or combinations thereof can be taken to increase the system capacity substantially.

Note that although embodiments of the invention have been discussed by way of example in the context of a CDMA communication system, they are not limited to CDMA systems. Rather, embodiments of the invention can include time-division multiple access (TDMA) and other communication systems. The time division duplex (TDD) mode of the 3G WCDMA standard, for example, defines downlink transmit diversity methods that are comparable to those in the frequency division duplex (FDD) mode. In particular, a closed-loop transmit diversity method that exploits the reciprocity of the multipath channel is specified for the dedicated traffic channels in 3GPP TS 25.224.

What is claimed is:

1. A method for wireless communication, comprising the steps of
    determining sectors of a cell;
    determining a first downlink transmission beam and a second downlink transmission beam in said sectors based on a received user-derived signal, the first downlink transmission beam being substantially uncorrelated with the second downlink transmission beam, the first downlink transmission beam being associated with a portion within a first sector of said spatial domain, the second downlink transmission beam being associated with a portion within a second sector;
    diversity encoding a first signal in said first sector to produce a first diversity-encoded signal;
    diversity encoding a second signal in said second sector to produce a second diversity-encoded signal;
    sending the first diversity-encoded signal over the first downlink transmission beam; and
    sending the second diversity-encoded signal over the second downlink transmission beam;
    wherein the first downlink transmission beam is associated with a first uplink multipath from a plurality of uplink multipaths associated with a first user, the second downlink transmission beam is associated with a second uplink multipath from the plurality of uplink multipaths, the first uplink multipath and the second uplink multipath being no less optimal than the remaining uplink multipaths from the plurality of uplink multipaths.

2. The method of claim 1, wherein: the first signal and the second signal are diversity encoded so that an associated decoder error rate is less than a decoder error rate for one diversity-encoded signal.

3. The method of claim 1, wherein the first sector substantially corresponds to the second sector.

4. The method of claim 1, wherein the first sector differs from the second sector.

5. The method of claim 1, wherein: the received user-derived signal includes a first component and a second component, the first component of the received user-derived signal being received on a first antenna array, the second component of the received user-derived signal being received on a second antenna array, the first antenna array differs from the second antenna array.

6. The method of claim 1, wherein: the received user-derived signal includes a first component and a second component, the first component of the received user-derived signal being received on a first antenna array, the second component of the received user-derived signal being received on a second antenna array, the first antenna array substantially corresponds to the second antenna array.

7. The method of claim 1, wherein: the first downlink transmission beam is associated with a first polarization, the second downlink transmission beam is associated with a second polarization substantially orthogonal to the first polarization.

8. The method of claim 7, wherein: the first sector substantially corresponds to the second sector, and the portion within the first sector substantially corresponds to the portion within the second sector.

9. The method of claim 7, wherein: the portion within the first sector differs from the portion within the second sector.

10. The method of claim 1, wherein: the portion within the first sector overlaps, at least partially, with the portion within the second sector.

11. The method of claim 1, wherein: the first downlink transmission beam is sent from a first antenna array, and the second downlink transmission beam is sent from a second antenna array.

12. The method of claim 1, wherein: the first downlink transmission beam is sent during a first time period, and the second downlink transmission beam is sent during a second time period that overlaps, at least partially, with the first time period.

13. The method of claim 1, wherein: the first downlink transmission beam is associated with a first frequency range, the second downlink transmission beam is associated with a second frequency range at least a portion of which is different from the first frequency range.

14. The method claim 1, wherein the diversity encoding further includes: multiplexing a first pilot signal and an information signal to produce a first multiplexed signal; spreading and scrambling the first multiplexed signal to produce a first spread/scrambled signal; and modifying the first spread/scrambled signal based on a first feedback signal.

15. The method of claim 14, wherein the diversity encoding further includes: multiplexing a second pilot signal and the information signal to produce a second multiplexed signal; spreading and scrambling the second multiplexed signal to produce a second spread/scrambled signal; and modifying the second spread/scrambled signal based on a second feedback signal.

16. The method of claim 1, wherein the determining includes: identifying a first multipath component and a second multipath component of the received user-derived signal for a first user, the first multipath component and the second multipath component being no less optimal than remaining multipath components of the received user-derived signal for the first user; identifying a first angular arrival range and a second angular arrival range based on the first multipath component and the second multipath component, respectively; and defining the first downlink transmission beam and the second downlink transmission beam based on the first angular arrival range and the second angular arrival range.

17. The method of claim 1, wherein the first signal and the second signal are diversity encoded based on the received user-derived signal.

18. The method of claim 1, wherein the first signal and the second signal are diversity encoded based on at least one characteristic of the received user-derived signal from the group of: a signal quality, a data rate, a signal strength, and a signal cross-correlation property.

19. The method of claim 1, wherein: the received user-derived signal includes a first component and a second component, the first component of the received user-derived signal being associated with its own multipath, the second component of the received user-derived signal being associated with its own multipath; the diversity encoding the first signal includes: determining a complex gain associated with the first diversity signal based on feedback information associated with the first component of the received user-derived signal; and the diversity encoding the second signal includes: determining a complex gain associated with the second diversity signal based on feedback information associated with the second component of the received user-derived signal.

20. The method of claim 1, wherein the first diversity-encoded signal is associated with its own diversity code, the second diversity-encoded signal is associated with its own diversity code that is separable from the diversity code associated with the first diversity-encoded signal.

21. A method for wireless communication for a first user, comprising the steps of:

determining a cell having a plurality of sectors;
receiving a first diversity-encoded signal from a first downlink transmission beam from one of said sectors; and
receiving a second diversity-encoded signal from a second downlink transmission beam from one of said sectors, the first downlink transmission beam being substantially uncorrelated with the second downlink transmission beam, the first downlink transmission beam being associated with a portion of a first sector of said plurality of sectors, the second downlink transmission beam being associated with a portion of a second sector of said plurality of sectors;
wherein the first downlink transmission beam is associated with a first uplink multipath from a plurality of uplink multipaths associated with the first user, the second downlink transmission beam is associated with a second uplink multipath from the plurality of uplink multipaths, the first uplink multipath and the second uplink multipath being no less optimal than the remaining uplink multipaths from the plurality of uplink multipaths.

22. The method of claim 21, further comprising:
sending a user-derived signal, the portion within the first sector being based on a first component of a received user-derived signal, the first component of the received user-derived signal being associated with a first multipath, and the portion within the second sector being based on a second component of the received user-derived signal, the second component of the received user-derived signal being associated with a second multipath.

23. The method of claim 21, wherein: the first downlink transmission beam is associated with a first polarization, the second downlink transmission beam is associated with a second polarization substantially orthogonal to the first polarization.

24. The method of claim 23, wherein: the first sector substantially corresponds to the second sector, and the portion within the first sector substantially corresponds to the portion within the second sector.

25. The method of claim 21, wherein: the portion within the first sector differs from the portion within the second sector.

26. The method of claim 21, wherein: the portion within the first sector overlaps, at least partially, with the portion within the second sector.

27. The method of claim 21, wherein: the first downlink transmission beam is sent from a first antenna array, and the second downlink transmission beam is sent from a second antenna array.

28. The method of claim 21, wherein: the first downlink transmission beam is sent during a first time period, and the second downlink transmission beam is sent during a second time period that overlaps, at least partially, with the first time period.

29. The method of claim 21, wherein: the first downlink transmission beam is associated with a first frequency range, the second downlink transmission beam is associated with a second frequency range at least a portion of which is different from the first frequency range.

30. The method of claim 21, wherein the first diversity-encoded signal and the second diversity-encoded signal have been diversity encoded based on a previous user-derived signal from the first user.

31. The method of claim 21, wherein the first diversity-encoded signal and the second diversity-encoded signal have been diversity encoded based on at least one characteristic of a previous user-derived signal from the group of: a signal quality, a data rate, a signal strength, and a signal cross-correlation property.

32. The method of claim 21, further comprising: sending an uplink signal, a first component of the uplink signal being associated with its own multipath, a second component of the uplink signal being associated with its own multipath; the first diversity-encoded signal having its own complex gain based on feedback information associated with the first component of the uplink signal; and the second diversity-encoded signal having its own complex gain based on feedback information associated with the second component of the uplink signal.

33. The method of claim 21, wherein the first diversity-encoded signal is associated with its own diversity code, the second diversity-encoded signal is associated with its own diversity code that is separable from the diversity code associated with the first diversity-encoded signal.

34. An apparatus, comprising:
a searcher configured to identify a received user-derived signal;
a beam controller coupled to the searcher;
a first transmit beam switch coupled to the beam controller;
a second transmit beam switch coupled to the beam controller;
a diversity coder coupled to the first transmit beam switch and the second transmit beam switch, the diversity coder configured to send a first diversity encoded signal to the first transmit beam switch based on the received user-derived signal and to send a second diversity encoded signal to the second transmit beam switch based on the received user-derived signal; and
an antenna array coupled to the first transmit beam switch and the second transmit beam switch, the antenna array configured to define a first downlink transmission beam and a second downlink transmission beam, the first downlink transmission beam being associated with a portion within a first sector, the second downlink transmission beam being associated with a portion within a second sector, the first downlink transmission beam being substantially uncorrelated to the second downlink transmission beam, the first downlink transmission beam being associated with the first diversity-encoded signal, the second downlink transmission beam being associated with the second diversity-encoded signal;
wherein the first downlink transmission beam is associated with a first uplink multipath/from a plurality of uplink multipaths associated with a first user, the second downlink transmission beam is associated with a second uplink multipath from the plurality of uplink multipaths, the first uplink multipath and the second uplink multipath being no less optimal than the remaining uplink multipaths from the plurality of uplink multipaths.

35. The apparatus of claim 34, wherein the first sector substantially corresponds to the second sector.

36. The apparatus of claim 34, wherein the first sector differs from the second sector.

37. The apparatus of claim 34, wherein the diversity coder includes: a first multiplexer configured to receive a first pilot signal and an information signal to produce a multiplexed signal; a first spread/scramble module coupled to the first multiplexer, the first spread/scramble module configured to receive the multiplexed signal associated with the first multiplexer, the first spread/scramble module configured to produce a spread/scrambled signal; and a first complex-gain multiplier coupled to the first spread/scramble module, the first complex-gain multiplier configured to receive the spread/scrambled signal associated with the first spread/scramble module and a first feedback signal.

38. The apparatus of claim 37, wherein the diversity coder further includes: a second multiplexer configured to receive a second pilot signal and the information signal to produce a multiplexed signal; a second spread/scramble module coupled to the second mutliplexer, the second spread/scramble module configured to receive the multiplexed signal associated with the second multiplexer, the second spread/scramble module configured to produce a spread/scrambled signal; and a second complex-gain multiplier coupled to the second spread/scramble module, the second complex-gain multiplier configured to receive the spread/scrambled signal associated with the second spread/scramble module and a second feedback signal.

39. The apparatus of claim 34, wherein the diversity coder further includes: a space-time coder configured to receive an information signal and configured to send a first space-time coded signal and a second space-time coded signal, the first space-time coded signal being orthogonal to the second space-time coded signal; a first spread/scramble module configured to receive the information signal and configured to send a spread/scrambled signal; and a second spread/scramble module configured to receive the space-time coded signal and configured to send a spread/scrambled signal.

40. The apparatus of claim 34, wherein: the searcher is configured to receive the received user-derived signal including a first component and a second component, the antenna array includes a first portion and a second portion, the first component of the received user-derived signal being received from a first user-derived reception beam on the first portion of the antenna array, the second component of the received user-derived signal being received from a second user-derived reception beam on the second portion of the antenna array, the first user-derived reception beam differs from the second user-derived reception beam, the first portion of the antenna array differs from the second portion of the antenna array.

41. The apparatus of claim 34, wherein: the searcher is configured to receive the received user-derived signal including a first component and a second component, the antenna array includes a first portion and a second portion, the first component of the received user-derived signal being received from a first user-derived reception beam on the first portion of the antenna array, the second component of the received user-derived signal being received from a second user-derived reception beam on the second portion of the antenna array, the first user-derived reception beam substantially corresponds to the second user-derived reception beam, the first portion of the antenna array substantially corresponds to the second portion of the antenna array.

42. The apparatus of claim 34, wherein: the first downlink transmission beam is associated with a first polarization, the second downlink transmission beam is associated with a second polarization substantially orthogonal to the first polarization.

43. The apparatus of claim 42, wherein: the first sector substantially corresponds to the second sector, and the portion within the first sector substantially corresponds to the portion within the second sector.

44. The apparatus of claim 34, wherein: the portion within the sector associated with the first downlink transmission beam differs from the portion within the sector associated with second downlink transmission beam.

45. The apparatus of claim 34, wherein: the portion within the sector associated with the first downlink transmission beam overlaps, at least partially, with the portion within the sector associated with second downlink transmission beam.

46. The apparatus of claim 34, wherein: the antenna array includes a first portion and a second portion, the first downlink transmission beam is sent from the first portion of the antenna array, and the second downlink transmission beam is sent from the second portion of the antenna array.

47. The apparatus of claim 34, wherein: the first downlink transmission beam is sent during a first time period, and the second downlink transmission beam is sent during a second time period that overlaps, at least partially, with the first time period.

48. The apparatus of claim 34, wherein: the first downlink transmission beam is associated with a first frequency range, the second downlink transmission beam is associated with a second frequency range at least a portion of which is different from the first frequency range.

49. The apparatus of claim 34, wherein: the searcher is configured to identify a first multipath component and a second multipath component of the received user-derived signal for a first user, the first multipath component and the second multipath component being no less optimal than remaining multipath components of the received user-derived signal for the first user; and the beam controller being configured to define the first downlink transmission beam and the second downlink transmission beam based on the first angular arrival range and the second angular arrival range.

50. The apparatus of claim 34, wherein the diversity coder is configured to encode a first signal and a second signal based on a received user-derived signal to produce the first diversity-encoded signal and the second diversity-encoded signal.

51. The apparatus of claim 34, wherein the diversity coder is configured to encode a first signal and a second signal based on at least one characteristic of the received user-derived signal from the group of: a signal quality, a data rate, a signal strength and a signal cross-correlation property, to produce the first diversity-encoded signal and the second diversity-encoded signal.

52. The apparatus of claim 34, wherein: the searcher is configured to receive the received user-derived signal, the received user-derived signal includes a first component and a second component, the first component of the received user-derived signal is associated with its own multipath, the second component of the received user-derived signal being associated with its own multipath; the diversity coder is configured to: determine a complex gain associated with the first diversity signal based on feedback information associated with the first component of the received user-derived signal; and determine a complex gain associated with the second diversity signal based on feedback information associated with the second component of the received user derived signal.

53. The apparatus of claim 34, wherein the first diversity-encoded signal is associated with its own diversity code, the second diversity-encoded signal is associated with its own diversity code that is separable from the diversity code associated with the first diversity encoded signal.

* * * * *